Figure 1:
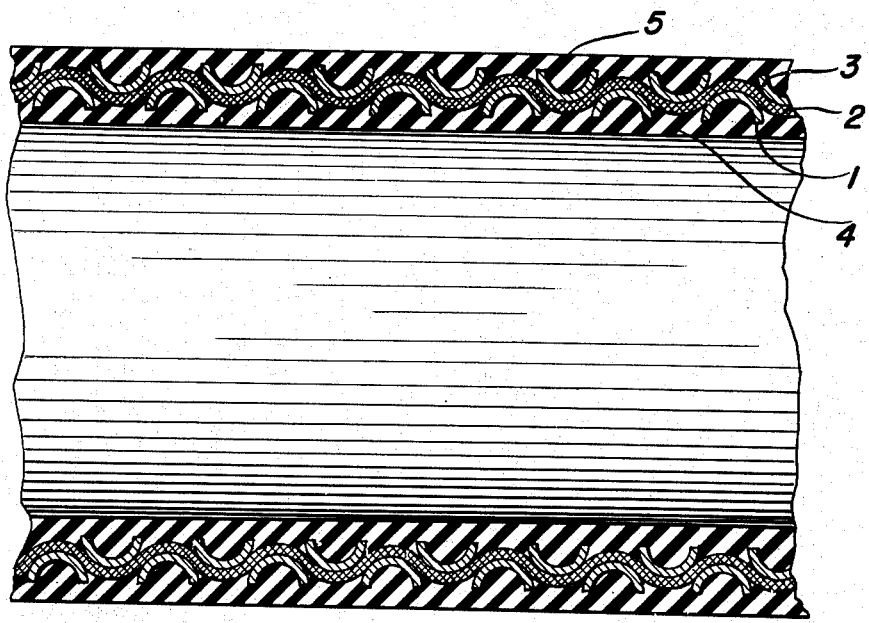

July 12, 1949.  A. E. CHERNACK  2,475,591
HOSE
Filed July 3, 1945

Inventor
Abel E. Chernack
By his attorneys
Howson and Howson

Patented July 12, 1949

2,475,591

UNITED STATES PATENT OFFICE 2,475,591

HOSE

Abel E. Chernack, Falls Village, Conn.; Mary Chernack, executrix of said Abel E. Chernack, deceased, assignor, by mesne assignments, to Wiremold Company, Hartford, Conn., a corporation of Connecticut Application July 3, 1945, Serial No. 603,016

9 Claims. (Cl. 138—56)

This invention relates to high pressure hose and more particularly to high pressure hose of large diameter having metallic reinforcing. It is an object of this invention to provide hose of the type described having improved construction, of great strength, and which can be readily and economically manufactured in units of any desired length. It is a further object of this invention to provide hose of the type described having a rubber or other suitable water or gas tight lining and a similar outer casing secured to the metallic reinforcing of the hose without the use of adhesives and in a manner insuring the lining and outer casing being retained in position. The objects and advantages of the invention will become apparent as the invention is described in connection with the accompanying drawing.

In the drawings—

Figure 2:
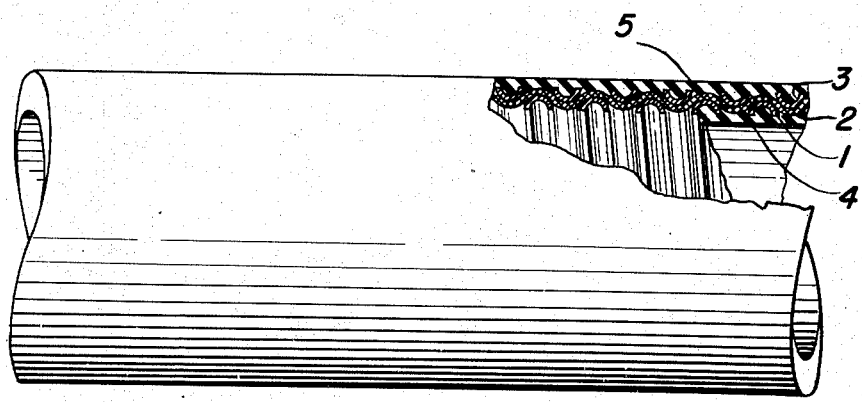

Fig. 1 is a longitudinal sectional view of a portion of hose constructed in accordance with this invention and Fig. 2 is a view partly in elevation and partly in section of a portion of hose constructed in accordance with this invention, part of the inner lining being broken away to show the inner spiral more clearly.

As shown in the drawings, hose constructed in accordance with this invention comprises a continuous spiral 1 formed of a metal strip bent to substantially a semi-circular shape in cross-section and wound with its concave face directed inwardly towards the longitudinal axis of the spiral. The spiral is wound with the convolutions thereof spaced apart, in the drawing the spacing is shown as substantially equal to the inner diameter of the semi-circular strip but it is to be understood a different spacing of the convolutions may be used.

Wound about the spiral 1 is a wrapping 2 formed of a plurality of overlapping layers of a textile or other suitable material which has been treated, on the outer face only, with a suitable rubber compound. The wrapping 2 is wound about the spiral 1 under considerable tension to insure bonding of the layers together and to press the wrapping 2 between the turns of the spiral 1. The wrapping 2 thus forms a continuous closed wall or layer between the spiral 1 and a similar spiral 3 which will now be described.

Wound about the wrapping 2 and positioned between the coils of the spiral 1 is a binding spiral 3 formed of a strip bent to substantially a semi-circular shape but wound with its concave face directed outwardly from the common longitudinal axis of the spirals 1 and 3. As shown in the drawings, the spirals 1 and 3 are wound of identical metal strips but it is to be understood that the dimensions of the strips of which the spirals 1 and 3 are formed may be different.

Secured to the inner spiral 1 by interlocking engagement therewith is an inner lining 4 of rubber or suitable plastic material which, by extrusion or otherwise, can be forced into interlocking engagement with the metal strip forming the spiral and also given a smooth inner surface. Similarly interlocked with the outer spiral 3 is an outer sheath or casing 5 of rubber or other suitable plastic material, the sheath or casing 5 being finished with a smooth outer surface. The hose is then suitably treated to insure the lining 4 and sheath 5 maintaining their proper shape and their connection with the spirals 1 and 3. In the case of rubber, this treatment might be a vulcanizing operation while in the case of some of the plastic materials, a heat treatment might be necessary. The lining 4 and the sheath 5 may be of different suitable materials. It is of course advantageous to use materials for which the same final treatment is suitable; but the invention is not necessarily limited in that respect.

Modifications in form within the scope of my invention will occur to those skilled in the art. Therefore I do not limit it to the form precisely as illustrated and described.

What is claimed is:

1. A hose comprising a plurality of metallic spirals, a continuous unbroken layer of fibrous material separating said spirals, said spirals being formed of strip material of trough-shape with the openings directed away from said fibrous material and means interlocked with said spirals to form an inner lining and an outer sheath.

2. A hose comprising a plurality of metallic spirals formed of strips having a trough-shape, a layer of fibrous material separating said spirals, said spirals having their convolutions alternating and their trough openings directed away from said fibrous material and means interlocked with said spirals to form an inner lining and an outer sheath.

3. A hose comprising a metallic spiral formed of a strip having a trough-shape with the opening directed inwardly towards the axis of the spiral, a fabric wrapping on said spiral forming a continuous unbroken layer or wall, a second spiral formed of a metallic strip having a trough-shape with its opening directed oppositely to the opening of said first spiral, said second spiral engaging said fabric wrapping between the convolutions of said first spiral and means interlocked with said first spiral to form a lining and with said second spiral to form a sheath for said hose.

4. A hose comprising a metallic spiral formed of a strip having a trough-shape with the opening directed inwardly towards the axis of said spiral, a fabric wrapping on said spiral, a second spiral formed of a metallic strip having a trough-shape with the opening directed outwardly, said second spiral engaging said fabric wrapping between the convolutions of said first spiral, a unitary inner lining interlocked with said first spiral and providing a smooth inner face for the hose and an outer sheath interlocked with said second spiral.

5. A hose comprising a metallic spiral formed of a strip having a semi-circular cross-section with its concave face directed inwardly towards the longitudinal axis of the spiral, a fabric wrapping on said spiral, a second spiral tightly enclosing said fabric wrapping and formed of a metallic strip having a semi-circular cross-section with its concave face directed oppositely to the concave face of said first spiral and having its convolutions interposed between the convolutions of said first spiral, an inner lining interlocked with said first spiral and providing a smooth inner face for the hose and an outer wrapping interlocked with said second spiral.

6. A hose comprising a metallic spiral formed of a strip having a trough-shape with the opening directed inwardly towards the axis of said spiral, a fabric wrapping on said spiral forming a continuous unbroken layer or wall, a second spiral engaging said fabric wrapping and forcing said wrapping between the convolutions of said first spiral, said second spiral being formed of a metal strip having a trough-shape with the opening directed oppositely to the opening of said first spiral, an inner lining interlocked with said first spiral and engaging said fabric wrapping and an outer wrapping interlocked with said second spiral and engaging said fabric wrapping.

7. A hose comprising a metallic spiral formed of a strip having a semi-circular cross-section with its opening directed inwardly toward the axis of the spiral, a fabric wrapping on said spiral, a second spiral encircling said wrapping formed of a metallic strip having a semi-circular cross-section with its opening directed outwardly away from the common axis of the spirals and having its convolutions interposed between the convolutions of said first spiral, an inner lining interlocked with said first spiral and an outer sheath interlocked with said second spiral.

8. A hose comprising an inner and an outer metallic helix, said helices being formed of strip material of trough-shape with the opening of the trough of said inner helix being directed inwardly towards the axis of said helix and the opening of the trough of said outer helix being directed oppositely to the opening of the trough of said inner helix and means interlocked with said helices to form an inner lining and an outer sheath.

9. A hose comprising two metallic spirals facing in opposite directions and of a cross-section constructed and arranged with hollow concave portions to receive and retain a mass of a plastic material filling said cross-section, and a mass of a plastic material retained by said spirals and forming a smooth inner lining and an outer sheath.

ABEL E. CHERNACK.

REFERENCES CITED

The following references are of record in the file of this patent:

UNITED STATES PATENTS

| Number | Name | Date |
|---|---|---|
| 593,842 | Greenfield | Nov. 16, 1897 |
| 817,060 | Greenfield | Apr. 3, 1906 |
| 945,686 | Bonner | Jan. 4, 1910 |
| 2,330,651 | Welger | Sept. 28, 1943 |